United States Patent Office 3,027,399
Patented Mar. 27, 1962

3,027,399
STABILIZED PREPOLYMERS
Rudolf Merten, Koln-Mulheim, Germany, assignor, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Filed Aug. 7, 1958, Ser. No. 753,650
Claims priority, application Germany Aug. 9, 1957
12 Claims. (Cl. 260—471)

This invention relates generally to polyurethanes and, more particularly to novel stabilized polyurethane prepolymers and to a method for making them.

Polyurethane prepolymers having terminal —NCO groups have been produced heretofore. A prepolymer is a material which is capable of further reacting, as for example, by cross-linking, to form polymeric materials such as, for example, polyurethane plastics. The polyurethane prepolymers have been produced by reacting an excess amount of organic polyisocyanate with an organic compound having at least two hydrogens capable of reacting with an isocyanate group. Examples of groups capable of reacting with an isocyanate group are hydroxyl, amine and carboxyl groups. The compounds which have been found most useful are, for example, the hydroxyl terminated polyesters, hydroxyl terminated polyethers, hydroxyl terminated polythioethers, hydroxyl terminated copolymers of carbon monoxide and an alkylene oxide and the like. The hydroxyl terminated polyesters may be produced by condensing a polycarboxylic acid, such as, an aliphatic dicarboxylic acid, with a polyhydric alcohol such as an aliphatic glycol. The glycol is used in an excess so that the polyester has predominately terminal hydroxyl groups. The organic polyisocyanate is reacted with the anhydrous hydroxyl terminated polyester, for example, in an excess over the stoichiometric amount needed to react with all the terminal hydroxyl groups to form an —NCO terminated polyester or prepolymer. The prepolymer may then be reacted with a cross-linking agent such as, for example, water to form a cellular polyurethane.

It has been found that the prepolymers have some storage stability so long as they are kept under anhydrous conditions. However, it has been noted that on storing for an appreciable period of time the polyester becomes more viscous and the isocyanate content thereof decreases.

The prepolymer containing terminal —NCO groups also contains urethane linkages. The urethane linkages are formed by isocyanate groups reacting with hydroxyl groups. It is known that urethane linkages contain hydrogen atoms which are capable of reacting with isocyanate groups. It is desirable that this secondary reaction of isocyanate groups with the hydrogen atoms of the urethane linkages be at least delayed if not completely prevented. Preventing this secondary reaction gives a storage stable prepolymer which is capable of being stored over a long period of time and makes it possible to work the prepolymer for a relatively long time in the liquid state. Heretofore, acidic substances such as, for example, acid chlorides have been added to the prepolymers to increase the storage stability of the prepolymer and to prevent secondary reactions of the hydrogen atoms of the urethane groups with isocyanate groups. However, using acid chlorides, such as, benzoyl chloride does not completely retard the secondary reactions and prepolymers so treated are not storage stable for a long period of time.

It is therefore an object of the invention to prepare improved storage stable prepolymers. Another object of the invention is to prepare prepolymers whose isocyanate content does not decrease on storing for an appreciable period of time. A further object of the present invention is to produce prepolymers whose viscosity does not increase on storing for an appreciable period of time. It is a still further object of the invention to stabilize those prepolymers containing both —NCO terminated groups and urethane groups so that the prepolymer is storage stable.

Generally speaking, the foregoing objects and others are accomplished in accordance with this invention by adding a non-basic organic boron compound to the prepolymer either during the reaction of the organic polyisocyanate and organic compound having reactive hydrogens or after the reaction but prior to storage. The amount of organic boron compound which is used varies as the reactivity of the prepolymers varies. However, it has been found that from about 0.01 percent to about 10 percent of the organic boron compound based on the weight of the isocyanate modified organic compound having reactive hydrogens or prepolymer will stabilize most prepolymers and produce an improved storage stable prepolymer. An amount of organic boron compound within this range is thus preferred.

In general, the invention may be carried out by two different modes of operation. One such mode is to add the organic boron compound to one or both of the reactants prior to the reaction forming the prepolymer. The organic boron compound may be added to organic compound having reactive hydrogens such as, for example, the hydroxyl terminated polyester and the polyester-organic boron compound mixture may be reacted with an excess of organic polyisocyanate, such as, for example, tolylene diisocyanate to form a storage stable prepolymer. Instead of adding the organic boron compound to the hydroxyl terminated polyester, it may be added to the organic polyisocyanate and the organic polyisocyanate containing the organic boron compound may be reacted with less than enough polyhydroxy compound to react with all the available —NCO groups of the organic polyisocyanate.

The second method of operation is to add the organic boron compound to the prepolymer or —NCO terminated reaction product of the organic compound having reactive hydrogens such as, for example, the hydroxyl terminated polyester and organic polyisocyanate, such as tolylene diisocyanate. After the reaction has been carried out, the non-basic organic boron compound is mixed with the prepolymer. Mixing is preferably done before any appreciable loss of —NCO.

The prepolymers which have been stabilized by adding an organic boron compound according to the present invention show a consistent viscosity on storing as well as a consistent —NCO content that does not decrease. The organic boron compounds do not interfere with catalysts which may be added to catalyze the reaction of the prepolymer as for example, in foaming. A tertiary amine may be added to the prepolymer and the prepolymer foamed by reaction with water to form a cellular polyurethane. It has not been necessary therefore to remove the stabilizing agent before further processing of the prepolymer. The organic boron compounds give a more stable prepolymer than has heretofore been produced. The boron stabilized prepolymers can further react without the organic boron compound interfering with subsequent reactions of the prepolymer.

Any suitable non-basic organic boron compound may be used in the invention. Examples of such suitable non-basic organic boron compounds are, for example, boron trialkyls, boron triaryls and boric acid esters such as boron trimethyl, boron triethyl, boron tri-(methylphenyl), boron tributyl, boron tripropyl, boron triisopropyl, boron triphenyl, triethyl borate, trimethyl borate, tripropyl borate, tributyl borate, triisopropyl borate, triisobutyl borate, trioctyl borate, and tricyclohexyl borate. Also included among the suitable boron compounds are alkylboronic acid esters, such as, for example, diethyl ethylboronate, diethylmethyl boronate, dialkylborinic acid esters, such as, for example, ethyl diethylborinate, triethylmethyl borinate, arylboronic acid esters, such as, for example, diisobutyl phenylboronate, diethylphenyl boronate, and diaryl borinic acid esters, such as, for example, ethyl diphenylborinate, isopropyl diphenyl borinate, and boroxines such as trimethoxyboroxine, triethoxyboroxine, tripropoxybroxine, tributoxyboroxine, alkyl halogen borons such as, for example, diethyl boron chloride, dimethyl boron chloride, tetraacetyl borate, and the like. In other words, any neutral or acidic compound containing boron which is non-reactive with the other components of the system may be used.

Any suitable organic compound having reactive hydrogens may be used in the invention. Such suitable organic compounds are, for example, compounds which contain more than one hydroxyl group bound to an aliphatic or aromatic bond. Examples of such polyhydroxy compounds are the monomeric di- and polyhydric alcohols, such as propane-1.2-diol, propane-1.3-diol, butane-1.3-diol, butane-1.4-diol, hexane-1.6-diol, trimethylol propane, hexanetriol, pentaerythritol and the like. Polyhydroxy compounds having a molecular weight of at least 500 may also be used in the invention. Such higher molecular weight polyhydroxy compounds are those produced by condensation, polyaddition and polymerization. Examples of such higher molecular weight polyhydroxy compounds are, for example, linear or branched hydroxyl terminated polyesters which are obtained by condensing di- or poly-hydric alcohols with di- or poly-carboxylic acids and/or hydroxy carboxylic acids. The alcohols are used in a slight excess so that the polyester will have terminal hydroxyl groups. It is possible to use saturated or unsaturated as well as aliphatic and aromatic reactants in the production of the polyesters. If an unsaturated di- or poly-hydric alcohol is used, for example, the polyester will contain unsaturated groups which may further react by polymerization with other compounds having unsaturated bonds. The polyesters may also be modified with saturated or unsaturated fatty acids and dimer acids. Linear or branched hydroxyl terminated polyester amides may also be used in the invention. The polyester amides are produced according to the process for producing polyesters except that compounds containing amine groups are used in place of the compounds containing hydroxyl groups. Hydroxyl terminated polyalkylene ether glycols, hydroxyl terminated polyalkylene thioether glycols, hydroxyl terminated polyacetals, hydroxyl terminated hydrogenation products of ethylene-carbon monoxide copolymers, hydroxyl terminated epoxide resins, partially spaonified vinyl acetate polymers or copolymers containing vinyl acetate and cellulose derivatives and the like may also be used in the invention.

Any suitable organic polyisocyanate may be used in the invention. Examples of such suitable organic polyisocyanates are tetramethylene diisocyanate, hexamethylene diisocyanate, m-xylylene diisocyanate, p-xylylene diisocyanate, 4,6-dimethyl-1,3-xylylene diisocyanate, cyclohexane-1,4-diisocyanate, dicyclohexyl methane-4,4'-diisocyanate, m-phenylene diisocyanate, p-phenylene diisocyanate, 1-alkylene benzene-2,4-diisocyanates such as 2,4-tolylene diisocyanate, 3-(a-isocyanatoethyl)-phenyl isocyanate, 1-alkyl benzene-2,6-diisocyanates such as 2,6-tolylene diisocyanate, 2,6-diethyl benzene-1,4-diisocyanate, diphenyl methane-4,4'-diisocyanate, diphenyl dimethyl methane-4,4'-diisocyanate, 3,3'-dimethoxy diphenyl methane-4,4'-diisocyanate, naphthalene-1,5-diisocyanate and mixtures thereof and the like. The polyhydroxy compounds can, of course, also be modified with polyisocyanates containing more than two isocyanate groups, for example, 1-methyl benzene-2,4,6-triisocyanate or triphenyl methane triisocyanate. Also included among the suitable polyisocyanates are reaction products of a polyhydric alcohol with an excess of polyisocyanates as for example, the reaction product of 1 mol of trimethylol propane and 3 mols of toluylene diisocyanate, as well as isocyanate modified polyesters, polyethers, polyesteramides and the like with free —NCO groups.

The stabilized prepolymers produced according to the invention may be used in making cellular polyurethanes, for example, which may be used for making sponges, cushions and the like. The prepolymers may also be used in making elastomeric rubber-like polyurethanes which may be used for making automobile tires, heels for shoes, and the like.

The invention is further illustrated by the following examples without being restricted thereto, the parts being by weight.

*Example 1*

About 100 grams of an hydroxyl terminated polypropylene ether glycol having an average molecular weight of about 2000, an hydroxyl number of about 56 and a viscosity of about 40 cp./75° C. are heated to about 80° C. with about 3 grams of trimethylol propane and about 1 ml. of the tri-n-butyl borate. About 20 grams of tolylene diisocyanate which is a mixture of about 65 percent 2,4-tolylene diisocyanate and about 35 percent 2,6-tolylene diisocyanate are added to the polyether reaction mixture. The temperature of the reaction mixture is then raised to about 120° C. The viscosity has risen to about 5000 cp./75° C. after about 3½ hours and at the end of 5 hours it has risen to about 10,000 cp./75° C.

The above process was repeated except that the boric acid ester was omitted from the reaction mixture. After a period of about 5 hours the viscosity had risen to about 32,000 cp./75° C.

*Example 2*

About 100 grams of an hydroxyl terminated polypropylene ether glycol as used in Example 1 and about 3 grams of trimethylol propane are mixed with about 0.02 percent of benzoyl chloride based on the weight of the polyether and about 0.5 percent of tri-n-butyl borate based likewise on the weight of the polyether are mixed at about 80° C. with about 20 grams of the tolylene diisocyanate used in Example 1. The temperature of the reaction mixture is then raised to about 120° C. At the end of three hours the viscosity of the reaction product is about 4000 cp./25° C.

The above reaction carried out without the addition of the boric acid esters gives a free polymer having a viscosity of over 100% more viscous after three hours reaction time than the stabilized reaction mass.

*Example 3*

About 100 grams of polypropylene glycol having a molecular weight of about 2000, an hydroxyl number of about 56 and a viscosity of about 40 cp./75° C. and about 3 grams of trimethylol propane are mixed at about 80° C. with about 0.5 percent triethyl borate based on the weight of the polyether. About 22.5 grams of tolylene diisocyanate which is a mixture of about 65 percent 2.4-tolylene diisocyanate and about 35 percent 2.6-tolylene diisocyanate are added after about 10 minutes. The temperature is then raised to about 120° C. After about 5 hours the viscosity was found to be about 3200 cp./75° C.

The above process was repeated except that the triethyl borate was omitted from the reaction mixture. After about 5 hours the reaction mixture had a viscosity of about 5600 cp./75° C.

The procedure set forth above was again followed except that about 1.0 percent triethyl borate was used in place of the 0.5 percent amount of triethyl borate.

The mixture was found to have a viscosity of about 2500 cp./75° C. at the end of about five hours.

*Example 4*

About 100 grams of an hydroxyl terminated polypropylene ether glycol having an average molecular weight of about 2,000, an hydroxyl number of about 56 and a viscosity of about 40 cp./75° C. are heated to a temperature of about 80° C. with about 3 grams of trimethylol propane and about 0.05 percent triphenyl boron based on the weight of the polyether. About 22.5 grams of the tolylene diisocyante used in the preceding example are added to the reaction mixture after about five minutes. The temperature of the reaction mixture is then raised to about 120° C. After about four hours the viscosity was found to be about 3400 cp./75° C.

The above process was carried out without the triphenyl boron and the reaction mixture had a viscosity of about 4400 cp./75° C. after about four hours.

*Example 5*

About 100 grams of an hydroxyl terminated polypropylene ether glycol having an average molecular weight of about 2,000, an hydroxyl number of about 56 and a viscosity of about 40 cp./75° C. are heated to a temperature of about 80° C. with about 1 gram of trimethylol propane and about 0.025 percent of benzoyl chloride based on the weight of the polyether. About 0.004 percent of iron also based on the weight of the polyether is added in the form of iron acetylactonate dissolved in benzene. The tri-n-butyl borate may be added immediately after adding the tolylene diisocyanate or the addition of the tri-n-butyl borate may be delayed until about 30 minutes after the tolylene diisocyanate is added to the reaction mixture. About 16 grams of tolylene diisocyanate are added to the reaction mixture and the temperature of the reaction mixture raised to about 120° C. After about 7 hours at a temperature of about 120° C. the following viscosity values were obtained.

|  | Cp./75° C. |
|---|---|
| Without tri-n-butyl borate | 5800 |
| With 1% tri-n-butyl borate | 2900 |
| With 1% tri-n-butyl borate added 30 minutes after adding the tolylene diisocyanate | 2500 |
| With 0.5% tri-n-butyl borate added 30 minutes after adding the tolylene diisocyanate | 3000 |

*Example 6*

About 100 grams of an hydroxyl terminated polypropylene ether glycol having an average molecular weight of about 2000, an hydroxyl number of about 56 and a viscosity of about 40 cp./75° C. are heated to a temperature of about 80° C. with about 23 grams of castor oil and about 0.025 percent of benzoyl chloride based on the weight of the polyether. The mixture is dehydrated for about 30 minutes in a water jet vacuum system at a temperature of about 80° C. About 0.004 percent of iron is added to the mixture in the form of iron acetylacetone dissolved in benzene. About 23.8 grams of tolylene diisocyanate are added after about 5 minutes. About 1 percent tri-n-butyl borate is added after about 30 minutes. About 20 grams of additional tolylene diisocyanate is also added after about 10 minutes to the reaction mixture. The reaction mixture has an initial viscosity of about 10,000 cp./25° C. The reaction mixture is stored at a temperature of about 70° C. After storing for about three weeks at a temperature of about 70° C. the reaction product shows a rise in viscosity of about 20%. A comparison test was run without the boric acid ester and a sample of this reaction product was taken at the same period of storage and it was found the comparison sample had a rise in viscosity of about 100%.

*Example 7*

About 100 grams of an hydroxyl terminated linear polyester obtained by condensing ethylene glycol and adipic acid having an average molecular weight of about 2000 and an hydroxyl number of about 55.0 and an acid number of about 1.1 are dehydrated for about 30 minutes under a water jet vacuum system at a temperature of about 130° C. About 16.6 grams of p-phenylene diisocyanate are then added and the temperature held at about 130° C. About 1 percent of tri-n-butyl borate based on the weight of the polyether is added after about 10 minutes. After about 2 hours a comparison sample was taken from a comparable mixture made without the boric acid ester. This sample shows a considerably more viscous consistency than the mixture made with the stabilizer. Also the —NCO content decreases more rapidly in the unstabilized sample than in the stabilized sample. After about 8 hours at a temperature of about 130° C. and another 16 hours at a temperature of about 70° C. the —NCO content of the mixture stabilized with the boric acid ester is found to be about 3.28 percent while the —NCO content of the unstabilized mixture is found to be about 2.55 percent. The unstabilized prepolymer is in addition considerably more viscous and more sparingly soluble than the stabilized prepolymer. The above process was carried out using about 0.025 percent benzyl chloride in place of the 1 percent tri-n-butyl borate. The prepolymer containing the benzyl chloride was found to have an —NCO content of about 2.65 percent.

*Example 8*

About 100 grams of a reaction product of about 3 mols tolylene diisocyanate with about 1 mol trimethylol propane are dissolved in about 100 grams of anhydrous chlorobenzene. About 1 percent of tri-n-butyl borate is added and the mixture stored at about 70° C. After about 3 days a sample of the stabilized mixture is compared with an identical unstabilized sample and the sample without the boric acid ester has a viscosity which is twice as high as the sample stabilized with the tri-n-butyl borate.

*Example 9*

About 100 grams of an hydroxyl terminated polypropylene ether glycol having an average molecular weight of about 2000, an hydroxyl number of about 56 and a viscosity of about 40 cp./75° C. and about 0.025 percent of benzoyl chloride and about 0.95 ml. of a 1 percent solution of iron acetylacetonate in benzene are heated to a temperature of about 80° C. About 17.4 grams of tolylene diisocyanate are then added to the reaction mixture at this temperature. The temperature is then raised to about 120° C. After about 30 minutes, one sample is stabilized with about 1 percent tri-n-butyl borate while a second sample is not so stabilized. After about 5 hours at a temperature of about 120° C. the difference in the viscosity of the two samples is about 100 percent. If the two samples are removed after being heated for 2 hours at a temperature of about 120° C. and are then stored at about 70° C., similar differences are found in the viscosity and in the —NCO content.

*Example 10*

About 100 grams of a polythioether obtained by condensing thiodiglycol and having an average molecular weight of about 2100 and having an hydroxyl number of about 53 are dehydrated for about 1 hour at a temperature of about 120° C. with a water jet vacuum system. After cooling to a temperature of about 100° C. about 16.4 grams of tolylene diisocyanate are added and the temperature raised to about 120° C. After about 10 minutes one sample has about 1 percent of tributyl borate added while the other sample has no stabilizer added to it. After about 30 minutes the unstabilized prepolymer shows a substantially higher viscosity and a lower —NCO content compared with the sample stabilized with the boric acid ester.

It is to be understood that any of the polyhydroxy compounds containing reactive hydrozen atoms or organic polyisocyanates or non-basic organic boron compounds disclosed as operable herein may be substituted in the foregoing working examples for those specific compounds used.

Although the invention has been described in considerable detail in the foregoing examples for the purpose of illustration, it is to be understood that such detail is solely for this purpose and that variations can be made therein by those skilled in the art without departing from the spirit and scope of the invention except as is set forth in the claims.

What is claimed is:

1. A stabilized prepolymer of a polyurethane, said prepolymer having urethane linkages and at least two —NCO groups and containing as the stabilizer a non-basic organo boron compound having at least one boron to carbon bond and being free from groups reactive with an —NCO group.

2. A stabilized prepolymer of a polyurethane, said prepolymer having urethane linkages and at least two —NCO groups and containing as the stabilizer a member selected from the group consisting of a trialkyl boron, a triaryl boron, a trialkyl borate, a triaryl borate, a tricyclohexyl borate, a monoalkylboronate, a dialkylborinate, a monoarylboronate, a diarylborinate, a trialkoxy boroxine, and an alkyl halogen boron.

3. The stabilized prepolymer of claim 1 wherein the said boron compound is a trialkyl boron.

4. The stabilized prepolymer of claim 1 wherein the said boron compound is a triaryl boron.

5. The stabilized prepolymer of claim 1 wherein the said boron compound is a trialkyl borate.

6. The stabilized prepolymer of claim 1 wherein the said boron compound is a monoalkylboronate.

7. The stabilized prepolymer of claim 1 wherein the said boron compound is a monoarylboronate.

8. The stabilized prepolymer of claim 1 wherein the said boron compound is an alkyl halogen boron.

9. The stabilized prepolymer of claim 1 wherein the said boron compound is a dialkylborinate.

10. The stabilized prepolymer of claim 1 wherein the said boron compound is a diarylborinate.

11. The stabilized prepolymer of claim 1 wherein the said boron compound is a trialkoxy boroxine.

12. The stabilized prepolymer of claim 1 wherein the said prepolymer contains from about 0.01 percent to about 10 percent by weight boron compound based on the weight of prepolymer.

References Cited in the file of this patent

UNITED STATES PATENTS

| | | |
|---|---|---|
| 2,517,944 | Upson | Aug. 8, 1950 |
| 2,729,618 | Muller et al. | Jan. 3, 1956 |
| 2,914,556 | Hostettler et al. | Nov. 24, 1959 |